United States Patent [19]

Hofmann

[11] 4,247,319
[45] Jan. 27, 1981

[54] PROCESS AND APPARATUS FOR CALIBRATING OF GLASS TUBE SECTIONS

[75] Inventor: Herbert Hofmann, Wiesbaden, Fed. Rep. of Germany

[73] Assignee: OVF Glastechnik GmbH, Schierstein, Fed. Rep. of Germany

[21] Appl. No.: 25,015

[22] Filed: Mar. 29, 1979

[51] Int. Cl.² ............................................. C03B 23/08
[52] U.S. Cl. ...................................... 65/109; 65/271; 65/277; 65/278; 65/296
[58] Field of Search ................. 65/108, 109, 271, 276, 65/277, 282, 296, 297

[56] References Cited

U.S. PATENT DOCUMENTS

| | | | |
|---|---|---|---|
| 2,368,169 | 1/1945 | Smith | 65/277 X |
| 2,613,479 | 10/1952 | Stong | 65/108 |

Primary Examiner—Arthur D. Kellogg
Attorney, Agent, or Firm—Zarley, McKee, Thomte, Voorhees & Sease

[57] ABSTRACT

The invention relates to a process for calibrating sections of glass tubing, wherein a glass-tubing section is heated to a softening temperature, shaped to the calibrating dimension, and allowed to cool. The invention furthermore concerns suitable equipment for implementing this process.

7 Claims, 2 Drawing Figures

PROCESS AND APPARATUS FOR CALIBRATING OF GLASS TUBE SECTIONS

BACKGROUND OF THE INVENTION

Glass tubing can be manufactured by a continuous process or by a discontinuous blowing (insufflation) process. The present state of the art allows drawing tubing up to a diameter of about 300 mm. Larger nominal widths can only be made by blowing into molds. The length of the glass tubing sections made by this method is determined by that of the mold, so that longer glass tubing must be made by fusing several such sections together.

The most diverse industrial applications require to manufacture tubing with the closest possible inside diameter tolerances. However the tolerances relating to glass tubing obtained both by drawing as well as by blowing are substantial, approximately $+/-1$ mm for lesser diameters and about $+/-5-6$ mm for larger ones. Where tight tolerances are desired, reshaping in the manner initially cited is required. There are several such methods:

The so-called KPG process is appropriate for reshaping sections of glass tubing with small diameters of a few millimeters as well as for dimensions as high as 200 mm. A non-scaling (non-oxidizing) metallic core is inserted in one glass tube section which is then closed at both ends. The inside space is evacuated through an aperture. A heat source raises the temperature of the glass until it deforms plastically and becomes snug with the core. Because of the differences in thermal coefficients of expansion, the metallic core shrinks more than the glass, whereby breaking off one end allows easy removal of the metallic core, and well satisfactory calibrated glass tubing section is thus obtained.

In another process, which is used mainly for lesser tubing diameters up to 30 mm maximum, the glass tubing is heated and continuously drawn over a mandril. The tolerance of the tubing thus made is somewhat larger than that for the KPG process.

All these processes suffer from the particular drawback of being only suitable for calibrating lesser diameter tubing. For larger rated widths, there has been so far no feasibility of calibrating the insides and outsides.

The invention addresses the problem of creating both a process and equipment for calibrating glass tubing sections even of appreciable and large diameters.

This problem is solved in that for a process of the initially cited kind, the glass of the tubing section clamped at both ends softened in the particular shaping zone in the case of external calibration is pressed against an external calibrating surface by means of a shaping element located inside said section and helically guided with respect to it, and in that for internal calibration, the softened glass is pressed against an internal calibrating surface by means of a shaping element outside said glass tubing and helically guided with respect to it.

Equipment for the implementation of the above problem and process is furthermore proposed, which is characterized by two mutually opposite, synchronously rotating clamping systems mounted on the same axis for the ends of the glass tubing section, by a holding means which is displaceable for both the inside and the outside of the glass tubing section and comprising a shaping element or a calibration surface, by an axially displaceable heater and by a mechanism allowing synchronous displacement of the holding means for the shaping element and calibration surface and the heater.

Using the process and the equipment of the invention, it is possible to carry out both an inside and an outside calibration of high precision on sections of glass tubing, adequate for the desired purpose. Tolerances of $+/-0.2$ mm were achieved for glass tubing sections with diameters as high as 450 mm.

Especially in recent years, glass apparatus design has increasingly required joints with other materials. Frequently for instance a column apex made of industrial glass must be provided with inserts of corrosion-proof metals. These inserts as a rule must be made hermetic in the column apex, which inevitably led to difficulties for the previously poor tolerances.

According to the invention, the glass tubing section clamped at both sides is merely softened in its particular zone of deformation. This can be implemented by any suitable heating system, for instance by a burner with its flame pointed at the particular location.

The helical guidance of the shaping element can be achieved while the glass tubing section is upright, however, preferably it will be rotated about its longitudinal axis and the shaping element will be guided axially along said glass tubing section. The shaping element and/or the calibration surface preferably consist of rotating rollers mounted axially parallel to the glass tubing section, even though other devices operating similarly may also be employed. The shaping element for instance may also be a convex surface. The calibration surface especially may also consist of a cylinder that in the case of rotating glass tubing sections may rotate concurrently. When two rollers are used as the shaping element or as the calibration surface, the latter will be wider and shall project beyond the former at both sides.

In a preferred procedure, the heat source—preferably a burner—will be guided synchronously with the shaping element and the calibration surface and parallel to these.

DESCRIPTION OF THE DRAWINGS

The invention will now be discussed more comprehensively in relation to the attached drawings, where.

DESCRIPTION OF THE PREFERRED EMBODIMENT

Figure 1:
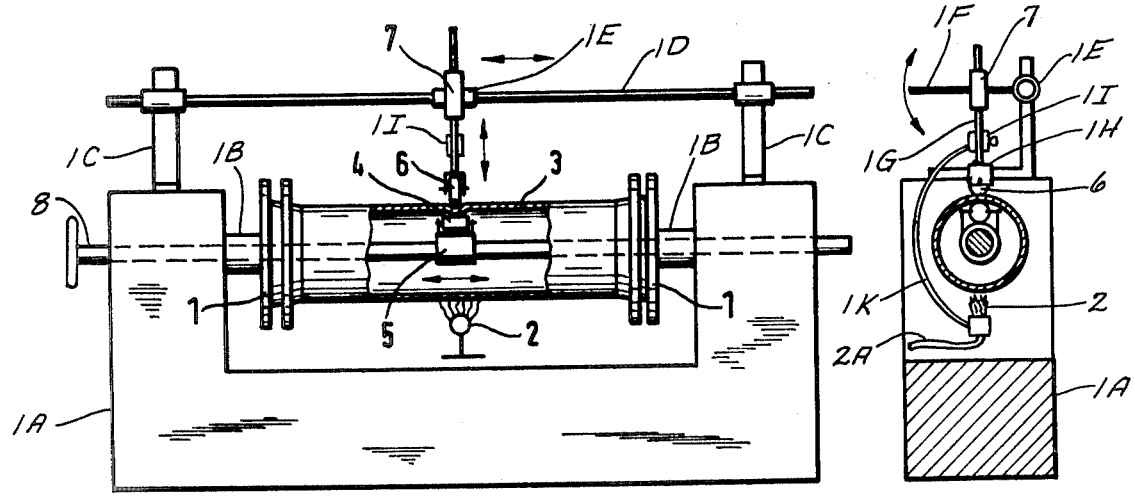
FIG. 1 is an inside calibration system in side-view and cross-section and FIG. 2 is an outside calibration system in side-view and cross-section.

The equipment of the invention consists of two clamping means 1 for the ends of a glass tubing section 3 which is to be calibrated. The two clamping means 1 are mounted on frame 1A. They are coaxially positioned and may be rotated synchronously by any conventional means (not shown). The clamping means 1 are rotatably mounted on frame 1A by suitable bearings 1B.

L-shaped brackets 1C are mounted on opposite ends of frame 1A and support rod 1D which is parallel to the center axis of tubing section 3.

Sleeve 1E is slidably mounted on rod 1D and can be selectively secured thereto as desired by any conventional means such as a thumb screw or the like (not shown). Sleeve 1E can also rotate about rod 1D if desired. A rod 1F extends laterally outwardly from sleeve 1E and slidably receives bracket 7 which can be selectively positioned on rod 1F by a conventional thumb screw or the like (not shown). Vertical rod 1G is selectively, adjustably mounted in bracket 7 and can again have its vertical position selectively positioned by a thumb screw or the like (not shown). The lower end of rod 1G terminates in a bracket 1H upon which is rotatably mounted a shaping roller 6.

A sleeve 1E is mounted on rod 1G and can be selectively positioned thereon. Bracket 1K extends downwardly from sleeve 1I as shown in FIGS. 1A and 2A to support a burner 2 underneath section 3. Burner 2 can be connected to a source of gas by flexible tube 2A or the like.

Figure 2:
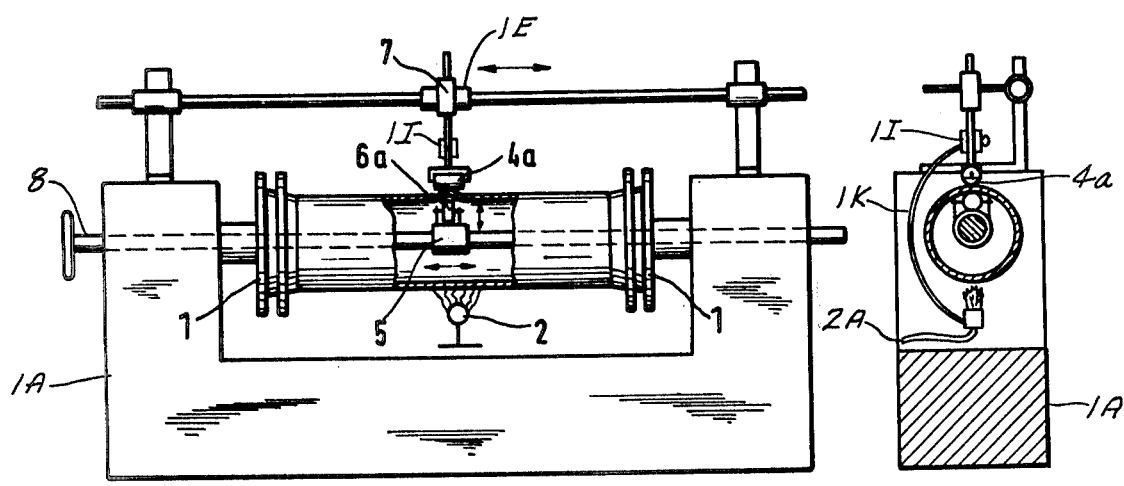

A horizontal shaft 8 extends through frame 1A and bearings 1B as well as holding means 1. Sleeve 5 is mounted on shaft 8. In FIG. 1, a roller 4 which is wider than the roller 6 is rotatably mounted on member 5. In FIG. 2, a roller 6A is mounted on member 5 and is narrower than the alternate roller 4A which is mounted on the lower end of rod 1G.

In operation, section 3 is heated in the portion where it is to be treated by burner 2. The glass can be calibrated once it has reached plastic deformation. For internal calibration (FIG. 1), shaping roller 6 presses the softened glass against the calibrating roller 4 during rotation of the glass tubing. The glass is calibrated by the co-action of rollers 4 and 6. The rollers 4 and 6 (as well as the rollers 4A and 6A in FIG. 2) can be moved longitudinally by sliding sleeve 1E on rod 1D concurrently with sliding shaft 8 longitudinally to effect the corresponding movement in a longitudinal direction of holding means 5. The burner 2 will also participate in this concurrent movement through its attachment to the vertical rod 1G.

The outside calibration of glass tube section 3 can take place as shown in FIG. 2 wherein the shaping roller 6A is inside and the calibration roller 4A is on the outside. Otherwise, the procedure of operating the device of FIG. 2 is the same as that of FIG. 1.

Calibration may take place over the entire length of the tubing by moving rollers 4 and 6, or 4A and 6A, longitudinally as herein described. A continuous inside or outside calibration is thus achieved.

On the other hand, there are cases for which calibration is required only at large spacings, for instance at 100 mm and more, for instance in bubble trays in column arrangement. In such cases calibration may be carried out merely at the particular required site.

Distillation columns sometimes have a considerable length. In such a case it is very often not possible to make the column in one piece. Therefore, it is produced from several pieces which are connected together by suitable closures. Thus, calibration can take place in regard to such pieces.

Thus, it is seen that the device of this invention will achieve at least all of its stated objectives.

I claim:

1. A process for calibrating glass tubing sections, in which a glass tubing section is heated to a softening temperature, shaped to the calibration dimension and allowed to cool, comprising, in that the softened glass, in the particular area of deformation of the glass tubing section clamped at both ends, in the case of outside calibration is pressed against an outside calibrating surface by means of a shaping element guided inside and in helical manner with respect to said glass tubing section, and in the case of inside calibration is pressed against an inside calibration surface by a shaping element guided outside and in helical manner with respect to said glass tubing section, rotatably supporting said calibrating surface in the form of a cylinder along an axis generally parallel to and radially offset from the axis of said glass tubing section.

2. The process of claim 1, characterized by rotating the glass tubing section about its longitudinal axis and by the shaping element and the calibrating surface being guided axially along the glass tubing section.

3. The process of claims 1 or 2, characterized in that a rotating roller mounted axially parallel to the glass tubing section is employed as the shaping element and-/or the calibration surface.

4. The process of claim 3, characterized in that rollers are used as the shaping element and the calibration surface, with the latter being wider than the former.

5. The process of claim 3, characterized in that a heat source acting on the glass tubing section is concurrently guided along with the shaping element and the calibrating surface and parallel to these.

6. A device for calibrating of glass tube sections, comprising, frame means, two opposite coaxially mounted and synchronously rotating clamping means on said frame means and adapted to engage the ends of the glass tubing section, means on said frame means for rotating said clamping means, axially displaceable holding means mounted both inside and outside the glass tubing section and comprising a shaping element and a calibration surface oppositely disposed to each other, an axially displaceable heater on said frame means, and means operatively connected to said holding means, said shaping element, said calibration surface, and said heater for simultaneous movement thereof in a direction parallel to the longitudinal axis of a glass tubing section held in said clamping means, said shaping element and said calibrating surface each comprising a rotating roller mounted generally axially parallel to the glass tubing section along respective axes offset from the axis of said glass tubing.

7. The device of claim 6 wherein the rollers comprise the shaping element and the calibrating surface with the latter being axially wider than the former.

* * * * *